`US010553841B2`

(12) United States Patent
Morita et al.

(10) Patent No.: US 10,553,841 B2
(45) Date of Patent: Feb. 4, 2020

(54) POWER STORAGE MODULE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventors: Kyohei Morita, Mie (JP); Tatsuya Sumida, Mie (JP)

(73) Assignees: AutoNetwork Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 16 days.

(21) Appl. No.: 16/073,945

(22) PCT Filed: Jan. 31, 2017

(86) PCT No.: PCT/JP2017/003353
§ 371 (c)(1),
(2) Date: Jul. 30, 2018

(87) PCT Pub. No.: WO2017/135232
PCT Pub. Date: Aug. 10, 2017

(65) Prior Publication Data
US 2019/0044111 A1 Feb. 7, 2019

(30) Foreign Application Priority Data
Feb. 1, 2016 (JP) .................. 2016-016865

(51) Int. Cl.
*H01M 2/26* (2006.01)
*H01M 2/10* (2006.01)
*H01M 10/6551* (2014.01)
*H01M 10/613* (2014.01)

(52) U.S. Cl.
CPC ....... *H01M 2/1016* (2013.01); *H01M 10/613* (2015.04); *H01M 10/6551* (2015.04)

(58) Field of Classification Search
CPC ............. H01M 2/1016; H01M 10/613; H01M 10/6551
See application file for complete search history.

(56) References Cited

U.S. PATENT DOCUMENTS

2004/0251858 A1   12/2004   Asao et al.

FOREIGN PATENT DOCUMENTS

| JP | 2013-045691 A | 3/2013 |
| JP | 2015-082410 A | 4/2015 |

OTHER PUBLICATIONS

International Search Report issued in International Application No. PCT/JP2017/003353 dated Mar. 28, 2017.

*Primary Examiner* — Jane J Rhee
(74) *Attorney, Agent, or Firm* — Honigman LLP (57) ABSTRACT

A power storage module includes: a heat sink that has a first bolt insertion hole; a frame that has a second bolt insertion hole through which a bolt is inserted; and a power storage unit that is stacked on the frame. The power storage unit includes a threaded portion that has a screw hole into which the bolt is screwed. The bolt is screwed into the screw hole of the threaded portion, with the bolt being inserted through the first bolt insertion hole and the second bolt insertion hole. A gap is formed between the heat sink and the frame.

10 Claims, 6 Drawing Sheets

POWER STORAGE MODULE

CROSS-REFERENCE TO RELATED APPLICATIONS

This application is the U.S. national stage of PCT/JP2017/003353 filed Jan. 31, 2017, which claims priority of Japanese Patent Application No. JP 2016-016865 filed Feb. 1, 2016.

TECHNICAL FIELD

A technique disclosed in this specification relates to a power storage module.

BACKGROUND ART

Conventionally, a power storage module disclosed in JP 2015-141878A is known. In the power storage module, a plurality of power storage units, each including a power storage element, are fixed to a plurality of support members, a plurality of brackets, and a plurality of frames using a plurality of bolts.

The configuration described above is problematic in that there are many bolting points, which makes the work involved in fixing the power storage unit complicated. Accordingly, there is concern that the efficiency of power storage module production will decrease.

The technique disclosed in this specification has been accomplished under the circumstances described above, and it is an object of the present disclosure to improve the efficiency of power storage module production.

SUMMARY

The technique disclosed in this specification relates to a power storage module including: a first case that includes a heat dissipation fin and a base wall, the base wall having a first bolt insertion hole through which a bolt is inserted; a frame that is stacked on the first case and has a second bolt insertion hole through which the bolt is inserted; and a power storage unit that is stacked on the frame. The power storage unit includes a threaded portion that has a screw hole into which the bolt is screwed, the bolt is inserted from the first case side into the first bolt insertion hole and the second bolt insertion hole, and screwed into the screw hole, and a gap is formed between the first case and the frame.

With the configuration described above, the first case, the frame, and the power storage unit can be combined into a unitary structure by inserting the bolt into the first bolt insertion hole of the first case and screwing the bolt into the screw hole of the threaded portion of the power storage unit. Accordingly, the number of screwing steps can be reduced as compared with the case where the first case, the frame, and the power storage unit are individually fixed by screwing a bolt. It is thereby possible to improve the production efficiency of the power storage module.

As embodiments for carrying out the technique disclosed in this specification, the following embodiments are preferable.

It is preferable that the power storage unit includes an attachment member for attaching the power storage unit to the first case and the frame, the attachment member includes: an abutment portion that abuts against the power storage unit from a side opposite to the frame; an extension portion that extends from an end portion of the abutment portion toward the frame along the power storage unit; and a fixing portion that has a shape that is bent from the end portion of the extension portion toward a space between the threaded portion of the power storage unit and the frame, the fixing portion having a third bolt insertion hole extending therethrough, the third bolt insertion hole being a hole through which the bolt is inserted, and the bolt is screwed into the screw hole of the threaded portion, with the bolt being inserted through the first bolt insertion hole, the second bolt insertion hole, and the third bolt insertion hole.

With the configuration described above, the first case, the frame, and the power storage unit can be reliably fixed using the attachment member.

It is preferable that the attachment member is formed by bending a single plate-like member, and the fixing portion is formed at each end portion of the attachment member.

With the configuration described above, the fixing portions of the attachment member are provided between the frame and the power storage unit, and thus do not protrude outward from the frame and the power storage unit. Accordingly, it is possible to miniaturize the power storage module as a whole.

It is preferable that a cavity in which the threaded portion is housed is formed in the frame, and the second bolt insertion hole is formed in a far wall of the cavity.

With the configuration described above, it is possible to easily position the frame and the power storage unit by housing the threaded portion in the cavity.

Also, it is preferable that a circuit forming member is housed in the frame, and a second case for covering the power storage unit is further attached.

With the configuration described above, it is possible to protect the power storage unit from coming into contact with extraneous matter.

Advantageous Effects of Invention

According to the technique disclosed in this specification, the efficiency of power storage module production is improved.

DETAILED DESCRIPTION OF PREFERRED EMBODIMENTS

Embodiment 1

Embodiment 1 that is the technique disclosed in this specification will be described with reference to FIGS. 1 to 6. A power storage module 10 according to the present embodiment is installed in a vehicle (not shown), and is configured to supply electric power to electronic components (not shown) or electric components (not shown) that are mounted on the vehicle. In the following description, the upward direction is taken as the Z direction, the front direction is taken as the Y direction, and the right direction is taken as the X direction. Also, with respect to a plurality of identical members, only a few are designated using a reference numeral, and others may be left unlabeled.

Power Storage Module 10

The power storage module 10 includes a power storage unit 11 that includes a power storage element (not shown), a frame 12 to which the power storage unit 11 is fixed, and a heat sink 13 (an example of a first case) on which the frame 12 is placed.

Heat Sink 13

The heat sink 13 is made of metal, and includes a base wall 15 and a plurality of heat dissipation fins 16 that extend upward from the upper surface of the base wall 15. As the metal for forming the heat sink 13, any metal such as aluminum, an aluminum alloy, copper, a copper alloy, or stainless steel can be appropriately selected as necessary. In the present embodiment, aluminum or an aluminum alloy is used.

The heat sink 13 has a substantially rectangular shape as viewed from above. The plurality of heat dissipation fins 16 formed on the upper face of the base wall 15 extend in the right-left direction, and are arranged side by side in a spaced apart manner in the front-back direction.

Figure 1:
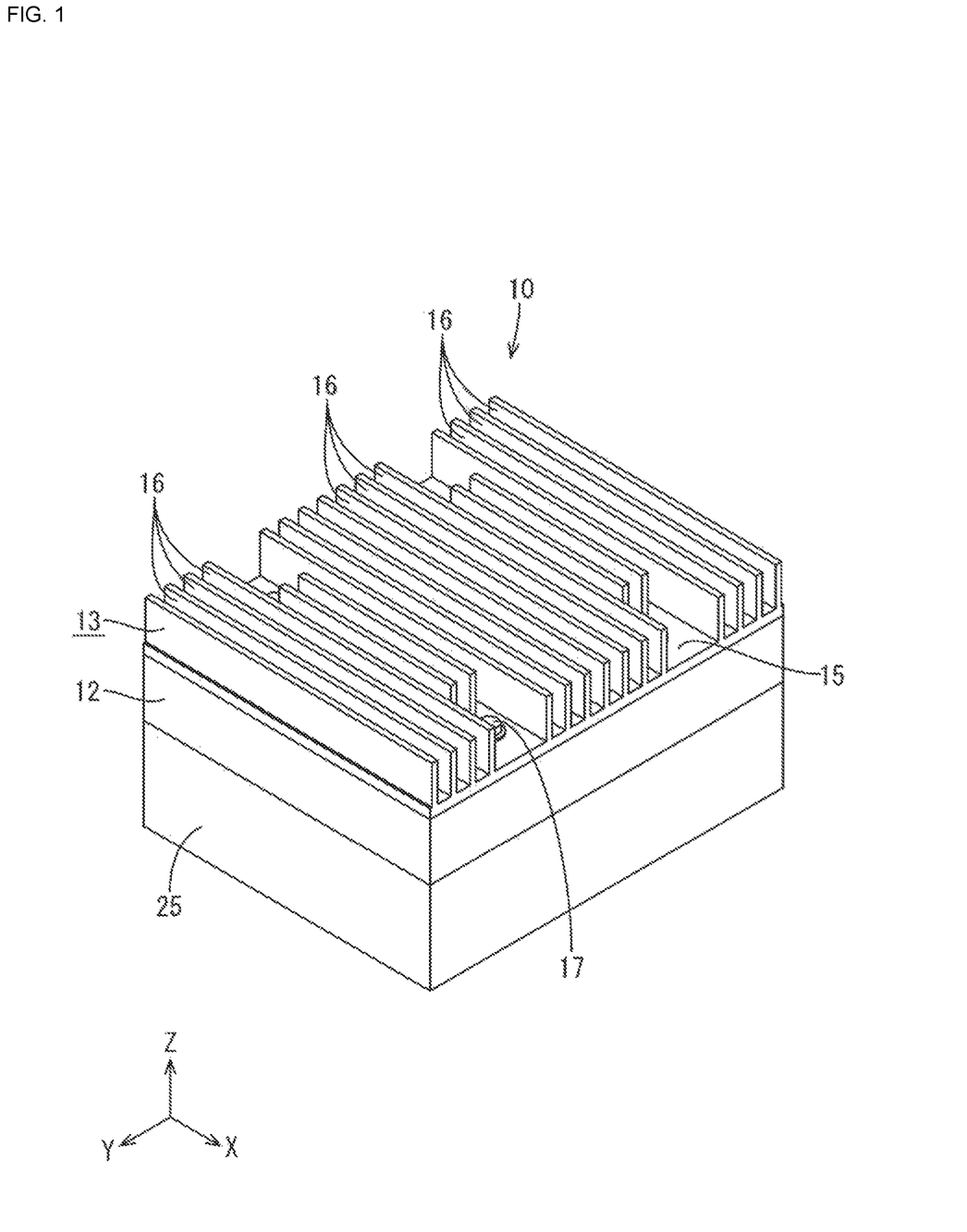
FIG. 1 is a perspective view of a power storage module according to Embodiment 1.
Figure 2:
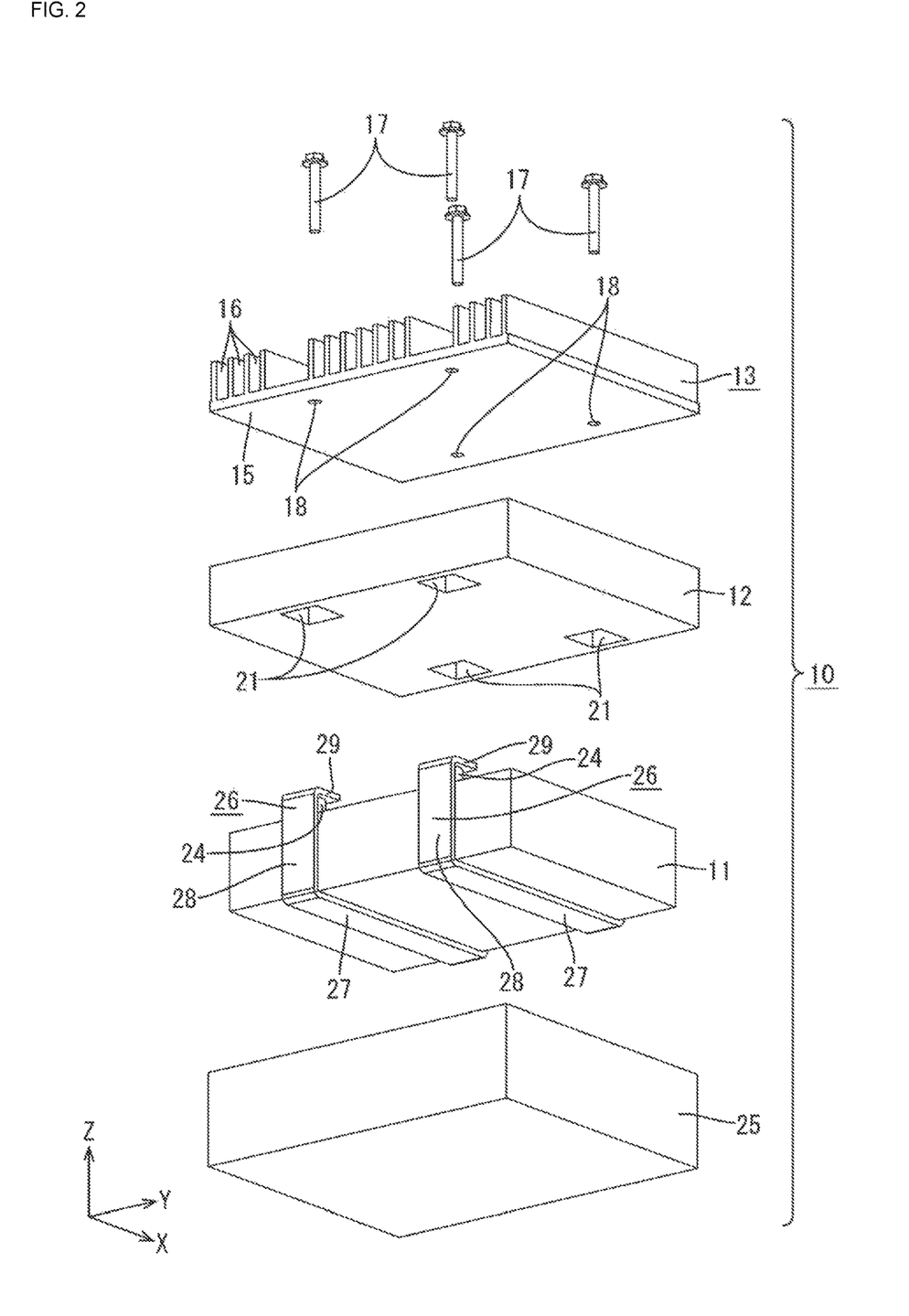
FIG. 2 is an exploded perspective view of the power storage module.
Figure 3:
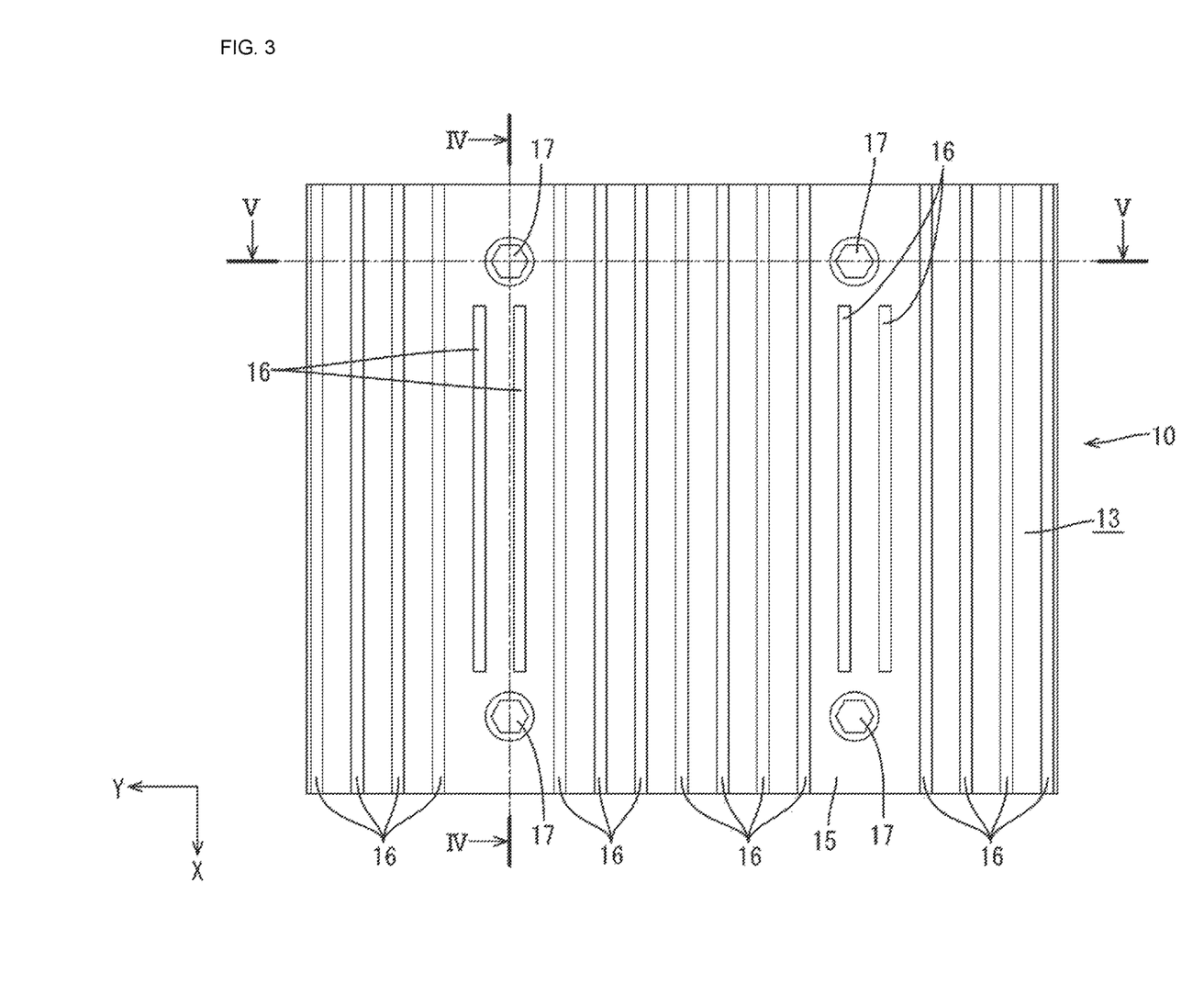
FIG. 3 is a plan view of the power storage module.

As shown in FIG. 3, the fifth and sixth heat dissipation fins 16 from the front and the fifth and sixth heat dissipation fins 16 from the back have a length dimension in the right-left direction that is shorter than the length dimension in the right-left direction of the other heat dissipation fins 16. In regions of the upper surface of the base wall 15 that are absent of heat dissipation fins 16 due to the length dimension in the right-left direction of the heat dissipation fins 16 being short, first bolt insertion holes 18 through which bolts 17 are inserted are formed so as to extend through the base wall 15 in the up-down direction. In the present embodiment, four first bolt insertion holes 18 are formed on the base wall 15.

Frame 12

Figure 4:
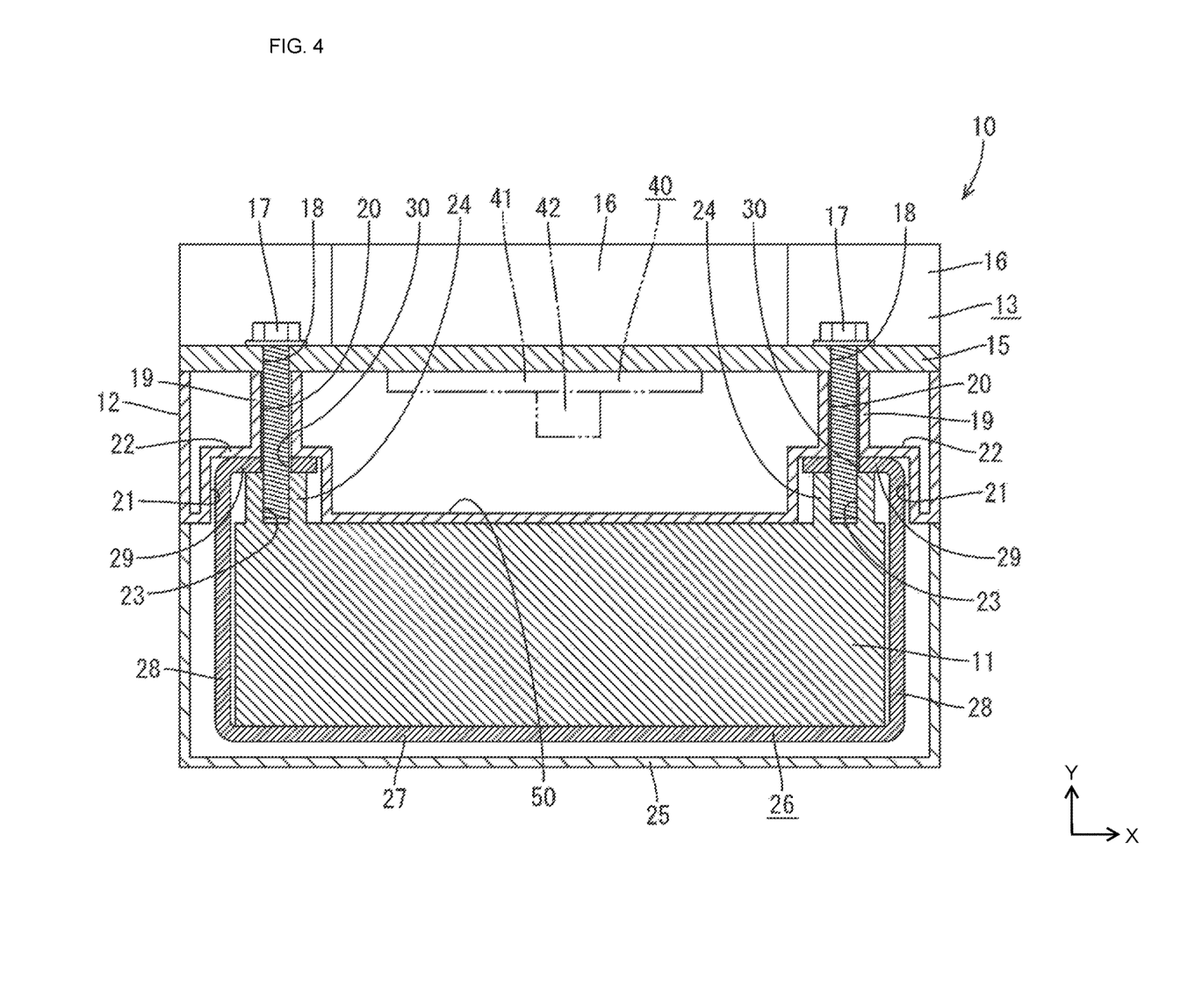
FIG. 4 is a cross-sectional view taken along the line IV-IV shown in FIG. 3.
Figure 5:
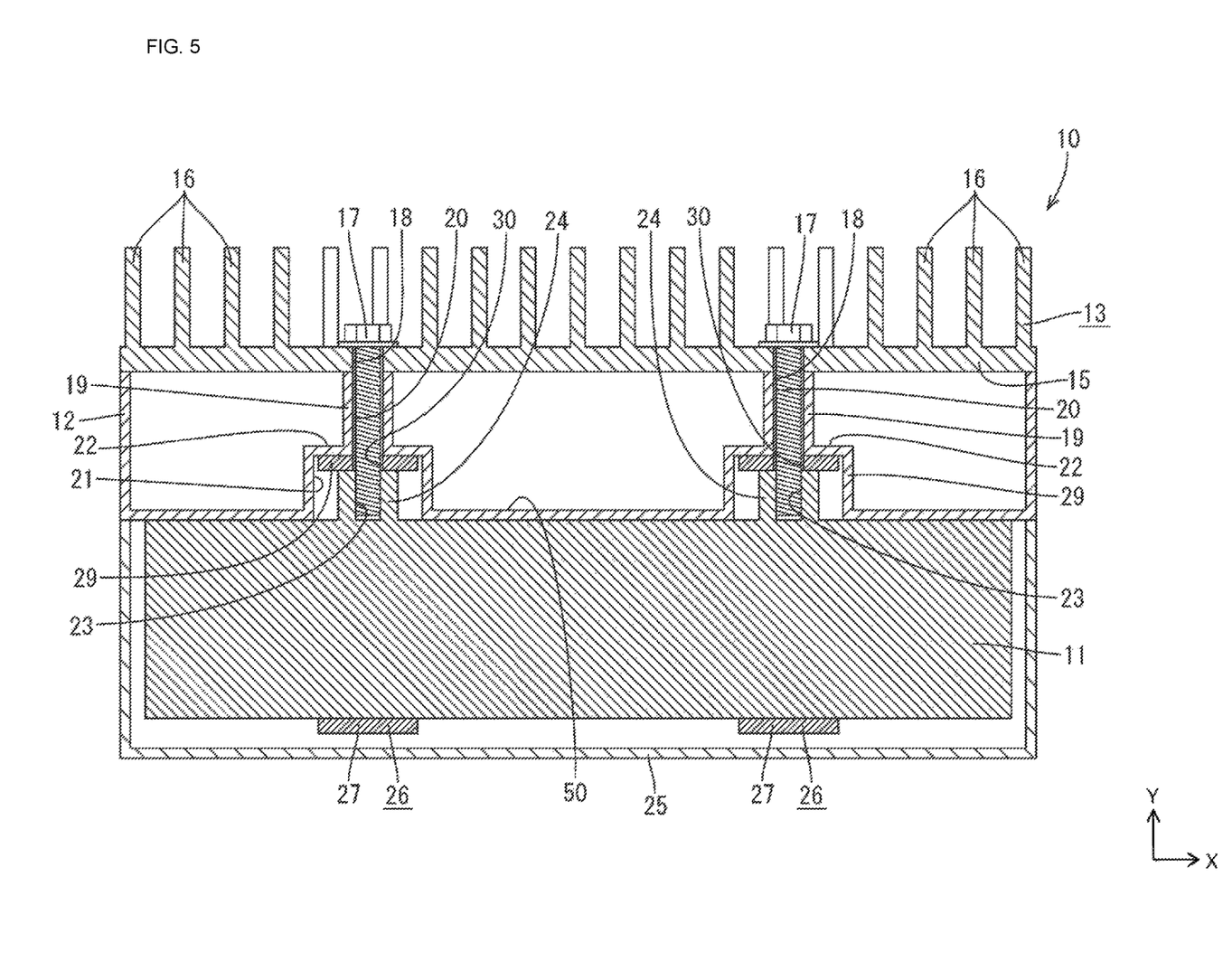
FIG. 5 is a cross-sectional view taken along the line V-V shown in FIG. 3.

As shown in FIGS. 4 and 5, the frame 12 is located below the heat sink 13. The frame 12 is formed in a box shape with an opening facing upward. The shape of the opening edge portion of the frame 12 is substantially the same as the outer shape of the base wall 15. With this configuration, as a result of the frame 12 being attached to the underside of the heat sink 13, the opening of the frame 12 is closed.

A circuit forming member 40 is housed inside the frame 12 (see FIG. 4). The circuit forming member 40 is composed of a circuit substrate 41 and an electronic component 42 that is mounted on the circuit substrate 41. In the present embodiment, the circuit forming member 40 is attached to the lower surface of the heat sink 13. However, the circuit forming member 40 may be attached to the frame 12.

The frame 12 is made of a metal such as aluminum or an aluminum alloy. The frame 12 includes pillar portions 19 that extend in the up-down direction and are provided at positions below the first bolt insertion holes 18 of the heat sink 13. The upper end portion of each of the pillar portions 19 abuts against the lower face of the base wall 15. A second bolt insertion hole 20 through which a bolt 17 is inserted is formed inside each of the pillar portions 19 so as to extend through the pillar portion 19 in the up-down direction.

Upper end edges of side walls of the frame 12 and the upper end portions of the pillar portions 19 abut against the lower face of the base wall 15 from below.

In the lower face of the frame 12, the periphery of the opening portion of each second bolt insertion hole 20 is depressed upward, thereby forming a cavity 21. Each second bolt insertion hole 20 is open in a far wall 22 that is located in the direction in which the cavity 21 is depressed (Z direction in FIG. 4). The cavity 21 has a square edge portion as viewed from below.

Power Storage Unit 11

The power storage unit 11 is located below the frame 12. The power storage unit 11 has a substantially rectangular parallelepiped shape, and a power storage element (not shown) is housed in the power storage unit 11. On the upper face of the power storage unit 11, threaded portions 24 are formed so as to protrude upward, each having a screw hole 23 into which a bolt 17 is screwed. The threaded portions 24 are formed at positions corresponding to the cavities 21 of the frame 12. With this configuration, the threaded portions 24 are respectively housed in the cavities 21.

The threaded portions 24 are each formed to have a shape that conforms to the shape of the cavities 21. In other words, the threaded portions 24 each have a rectangular prismatic shape that protrudes upward from the upper wall of the power storage unit 11. In the upper face of each threaded portion 24, a screw hole 23 into which a bolt 17 is screwed is formed so as to extend in the up-down direction. The screw hole 23 is a bottomed hole.

Cover 25

To the underside of the frame 12, a cover 25 (an example of a second case) is attached that covers, from below, the power storage unit 11 that is attached to the frame 12. The cover 25 may be made of a synthetic resin, or a metal. It is possible to appropriately select any material as necessary.

The frame 12 and the cover 25 can be attached to each other by a known fixing means. For example, the frame 12 and the cover 25 may be combined by a lock receiving portion (not shown) formed on the cover 25 being elastically engaged with a lock projection portion (not shown) formed on the frame 12.

Attachment Member 26

Figure 6:
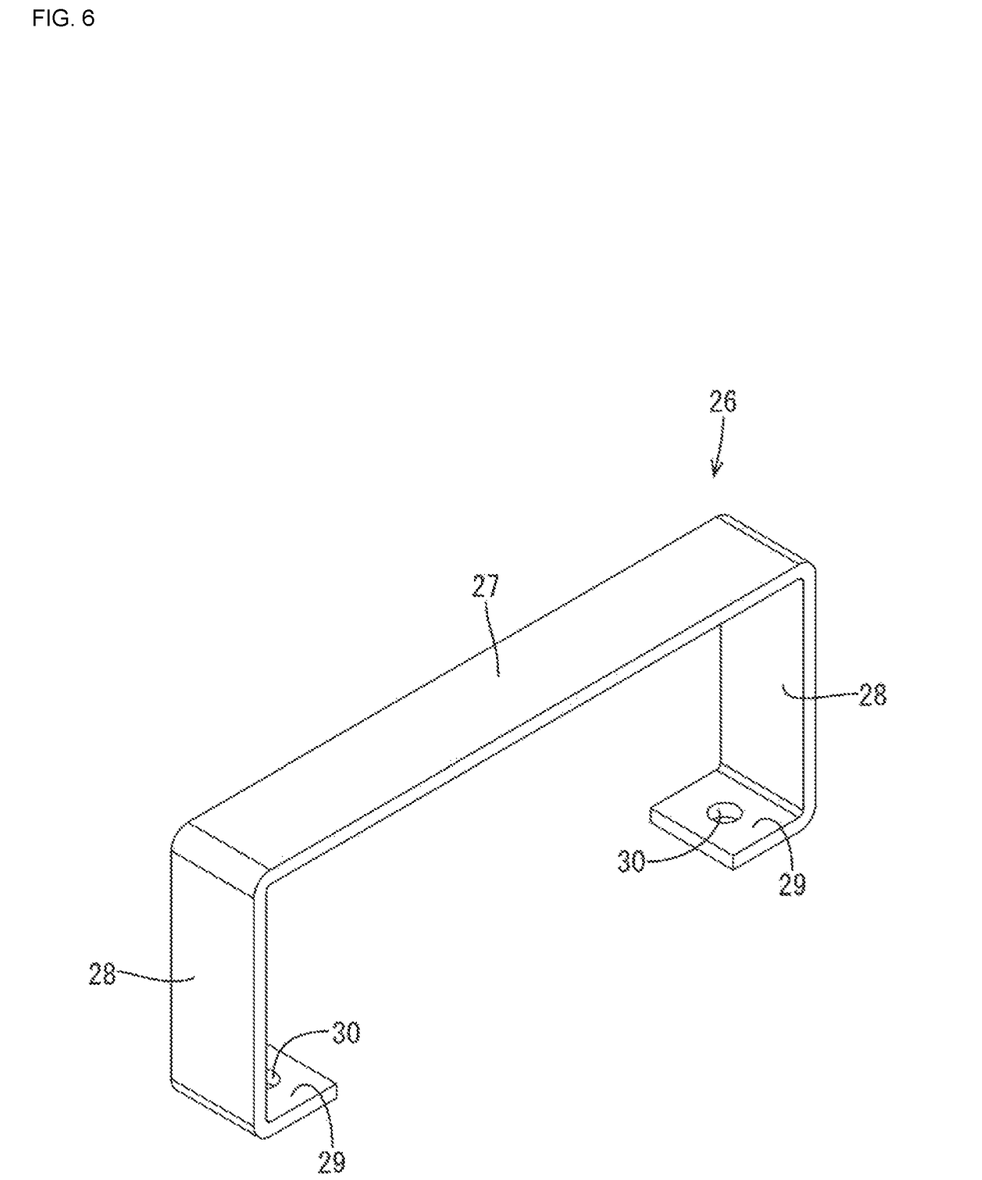
FIG. 6 is a perspective view of an attachment member.

As shown in FIG. 6, an attachment member 26 is formed by pressing a metal plate into a predetermined shape. The attachment member 26 is shaped by bending a metal plate having an elongated rectangular shape. As the metal for forming the attachment member 26, any metal such as aluminum, an aluminum alloy, copper, a copper alloy, iron, an iron alloy, or stainless steel can be appropriately selected as necessary.

As shown in FIG. 4, the attachment member 26 includes an abutment portion 27 that abuts against, from below, the lower surface of the power storage unit 11, two extension portions 28 that extend upward from opposing end portions of the abutment portion 27, and two fixing portions 29 that are bent inward in the right-left direction from the upper end portions of the extension portions 28. In each of the fixing portions 29, a third bolt insertion hole 30 through which a bolt 17 is inserted is formed so as to extend through the fixing portion 29 in the up-down direction.

The fixing portions 29 are attached to the frame 12 and the power storage unit 11 as a result of the fixing portions 29 being inserted into the cavities 21 of the frame 12 and sandwiched between the far wall 22 of the cavities 21 and the upper surfaces of the threaded portions 24.

The distance between the lower surface of the fixing portions 29 and the upper surface of the abutment portion 27 is set to be the same as or slightly smaller than the height dimension between the lower face of the power storage unit 11 and the upper face of the threaded portions 24. With this configuration, by attaching the attachment member 26 to the power storage unit 11, the power storage unit 11 is sandwiched from above and below by the abutment portion 27 and the fixing portions 29 of the attachment member 26.

A gap is formed between the heat sink 13 and the frame 12, and the circuit forming member 40 is disposed in the gap.

Step of Assembling Power Storage Module 10

Next, an example of a step of assembling a power storage module 10 will be described. It is to be noted that the step of assembling a power storage module 10 is not limited to the following description.

The attachment member 26 is attached to the power storage unit 11 from the front or the back. To be specific, the power storage unit 11 is fitted into a space surrounded by the abutment portion 27, the extension portions 28, and the fixing portions 29 of the attachment member 26, from the front or the back. Then, the fixing portions 29 are abutted against, from above, the threaded portions 24 of the power storage unit 11, and the abutment portion 27 abuts against, from below, the lower face of the power storage unit 11. As a result, the power storage unit 11 is supported by the attachment member 26 in a sandwiched manner.

The frame 12 is combined, from above, with the power storage unit 11 to which the attachment member 26 has been attached. At this time, the frame 12 is brought closer to the power storage unit 11 from above so that the cavities 21 formed on the lower face of the frame 12 are aligned with the threaded portions 24 of the power storage unit 11, and the threaded portions 24 are housed in the cavities 21.

Next, the heat sink 13 is attached to the frame 12 from above. To be specific, the lower surface of the base wall 15 of the heat sink 13 is placed on the upper end edges of the side edges of the frame 12 and the upper surfaces of the pillar portions 19 of the frame 12. At this time, the heat sink 13 is combined with the frame 12 such that the second bolt insertion holes 20 formed in the upper faces of the pillar portions 19 of the frame 12 are aligned with the first bolt insertion holes 18 formed in the base wall 15 of the heat sink 13.

Next, a bolt 17 is inserted from above into each of the first bolt insertion holes 18. The bolts 17 are inserted from above into the first bolt insertion holes 18 of the heat sink 13, the second bolt insertion holes 20 of the frame 12, and the third bolt insertion holes 30 of the attachment member 26 in this order, and thereafter, screwed into the screw holes 23 of the power storage unit 11. As a result of the bolts 17 being screwed into the screw holes 23, the power storage unit 11, the attachment member 26, the frame 12, and the heat sink 13 are combined into a unitary structure between the heads portion of the bolts 17 and the threaded portions 24. In this state, the abutment portion 27 of the attachment member 26 abuts against the lower surface of the power storage unit 11, and thus the attachment member 26 is prevented from falling off the power storage unit 11.

Finally, the cover 25 is attached to the frame 12 such that the power storage unit 11 is covered by the cover 25. As a result, a power storage module 10 is obtained.

Functions and Effects of Embodiment

Next, the functions and effects of the present embodiment will be described. The power storage module 10 according to the present embodiment is a power storage module 10 that includes: a heat sink 13 that includes a heat dissipation fin 16 and a base wall 15, the base wall 15 having a first bolt insertion hole 18 through which a bolt 17 is inserted; a frame 12 that is stacked on the heat sink 13 and has a second bolt insertion hole 20 through which the bolt 17 is inserted; and a power storage unit 11 that is stacked on the frame 12. The power storage unit 11 includes a threaded portion 24 that has a screw hole 23 into which the bolt 17 is screwed, the bolt 17 is inserted from the heat sink 13 side into the first bolt insertion hole 18 and the second bolt insertion hole 20, and screwed into the screw hole 23, and a gap 50 is formed between the heat sink 13 and the frame 12.

With the configuration described above, the heat sink 13, the frame 12, and the power storage unit 11 can be combined into a unitary structure by inserting the bolt 17 into the first bolt insertion hole 18 of the heat sink 13 and screwing the bolt 17 into the screw hole 23 of the threaded portion 24 of the power storage unit 11. Accordingly, the number of screwing steps can be reduced as compared with a case where the heat sink 13, the frame 12, and the power storage unit 11 are individually fixed by being screwed. It is thus possible to improve the production efficiency of the power storage module 10.

Specifically, for example, in the case where each member is individually fixed by being screwed, a first screwing step needs to be performed to fix the heat sink 13 and the frame 12. Then, a second screwing step needs to be performed to fix the frame 12 and the power storage unit 11, and thereafter a third screwing step needs to be performed to fix the power storage unit 11 and the heat sink 13.

In contrast, the present embodiment has the effect of being able to fix the heat sink 13, the frame 12, and the power storage unit 11 through a single screwing step, and thus the effect of improving the production efficiency of the power storage module 10 is achieved.

Also, according to the present embodiment, when the power storage module 10 is disassembled so as to recover/retrieve the power storage unit 11, by removing the bolt 17 from the heat sink 13 side, the power storage unit 11 can be easily separated from the power storage module 10.

To be specific, for example, in the case where each member is individually fixed by screwing a bolt, even if the bolt 17 that fixes the heat sink 13 and the frame 12 is removed, the frame 12 and the power storage unit 11 are still screwed together. Then, even if the bolt 17 that fixes the frame 12 and the power storage unit 11 is removed, the heat sink 13 and the power storage unit 11 are still screwed together. That is, in the case where each member is individually fixed by screwing a bolt, it is not possible to separate the power storage unit 11 from the power storage module 10 unless all of the bolts 17 are removed.

In contrast, according to the present embodiment, with a simple method of removing the bolts 17 exposed from the upper surface of the heat sink 13, the power storage module 10 can be separated from the power storage unit 11.

Also, according to the present embodiment, the power storage unit 11 includes an attachment member 26 for attaching the power storage unit 11 to the heat sink 13 and the frame 12. The attachment member 26 includes: an abutment portion 27 that abuts against the power storage unit 11 from a side opposite to the frame 12; an extension portion 28 that extends from an end portion of the abutment portion 27 toward the frame 12 along the power storage unit 11; and a fixing portion 29 that has a shape that is bent from the end portion of the extension portion 28 toward a space between the threaded portion 24 of the power storage unit 11 and the frame 12, the fixing portion 29 having a third bolt insertion hole 30 extending therethrough, the third bolt insertion hole 30 being a hole through which the bolt 17 is inserted. The bolt 17 is screwed into the screw hole 23 of the threaded portion 24, with the bolt 17 being inserted through the first bolt insertion hole 18, the second bolt insertion hole 20, and the third bolt insertion hole 30.

With the configuration described above, the heat sink 13, the frame 12, and the power storage unit 11 can be reliably fixed by using the attachment member 26.

Also, according to the present embodiment, the attachment member 26 is formed by bending a single plate-like member, and the fixing portion 29 is formed at each end portion of the attachment member 26.

With the configuration described above, the fixing portions 29 of the attachment member 26 are provided between the frame 12 and the power storage unit 11, and thus do not protrude outward from the frame 12 and the power storage unit 11. Accordingly, it is possible to miniaturize the power storage module 10 as a whole.

Also, according to the present embodiment, a cavity 21 in which the threaded portion 24 is housed is formed in the frame 12, and the second bolt insertion hole 20 is formed in a far wall 22 of the cavity 21.

With the configuration described above, it is possible to easily position the frame 12 and the power storage unit 11 by housing the threaded portion 24 in the cavity 21.

Also, according to the present embodiment, a circuit forming member 40 is housed in the frame 12, and a cover 25 for covering the power storage unit 11 is further attached.

With the configuration described above, the cover 25 can protect the power storage unit 11 from coming into contact with extraneous matter.

Other Embodiments

The technique disclosed in this specification is not limited to the embodiment described in the foregoing description with reference to the drawings, and for example, the following embodiments are also included in the technical scope of the technique disclosed in this specification.

(1) A configuration is possible in which a threaded portion 24 is depressed, and a protruding portion that is formed so as to protrude from the frame 12 toward the threaded portion 24 is housed in the threaded portion 24, with the protruding portion having a second bolt insertion hole 20 formed in a leading end portion thereof.

(2) A fixing portion 29 is formed at each end portion of the attachment member 26, but the configuration is not limited thereto. A fixing portion 29 may be formed only at one end portion.

(3) The attachment member 26 has an elongated plate-like shape, but the configuration is not limited thereto. The attachment member 26 may have any shape.

(4) The power storage unit 11 may include a plurality of power storage units 11, and the attachment member 26 may be provided for each of the plurality of power storage units 11.

(5) In the present embodiment, the heat sink 13 made of a metal is used as the first case, but the configuration is not limited thereto, and the first case may be made of a synthetic resin.

The invention claimed is:

1. A power storage module comprising:
a first case that includes a heat dissipation fin and a base wall, the base wall having a first bolt insertion hole through which a bolt is inserted;
a frame that is stacked on the first case and has a second bolt insertion hole through which the bolt is inserted; and
a power storage unit that is stacked on the frame,
wherein the power storage unit includes a threaded portion that has a screw hole into which the bolt is screwed,
the bolt is inserted from the first case side into the first bolt insertion hole and the second bolt insertion hole, and screwed into the screw hole, and
a gap is formed between the first case and the frame.

2. The power storage module according to claim 1,
wherein the power storage unit includes an attachment member for attaching the power storage unit to the first case and the frame,
the attachment member includes:
an abutment portion that abuts against the power storage unit from a side opposite to the frame;
an extension portion that extends from an end portion of the abutment portion toward the frame along the power storage unit; and
a fixing portion that has a shape that is bent from the end portion of the extension portion toward a space between the threaded portion of the power storage unit and the frame, the fixing portion having a third bolt insertion hole extending therethrough, the third bolt insertion hole being a hole through which the bolt is inserted, and
the bolt is screwed into the screw hole of the threaded portion, with the bolt being inserted through the first bolt insertion hole, the second bolt insertion hole, and the third bolt insertion hole.

3. The power storage module according to claim 2,
wherein the attachment member is formed by bending a single plate-like member, and
the fixing portion is formed at each end portion of the attachment member.

4. The power storage module according to claim 1,
wherein, a cavity in which the threaded portion is housed is formed in the frame, and
the second bolt insertion hole is formed in a far wall of the cavity.

5. The power storage module according to claim 1,
wherein a circuit forming member is housed in the frame, and
a second case for covering the power storage unit is further attached.

6. The power storage module according to claim 2, wherein, a cavity in which the threaded portion is housed is formed in the frame, and the second bolt insertion hole is formed in a far wall of the cavity.

7. The power storage module according to claim 3, wherein, a cavity in which the threaded portion is housed is formed in the frame, and the second bolt insertion hole is formed in a far wall of the cavity.

8. The power storage module according to claim 2, wherein a circuit forming member is housed in the frame, and a second case for covering the power storage unit is further attached.

9. The power storage module according to claim 3, wherein a circuit forming member is housed in the frame, and a second case for covering the power storage unit is further attached.

10. The power storage module according to claim 4, wherein a circuit forming member is housed in the frame, and a second case for covering the power storage unit is further attached.

* * * * *